United States Patent [19]

Haas et al.

[11] Patent Number: 5,082,357
[45] Date of Patent: Jan. 21, 1992

[54] METHOD AND DEVICE FOR CORRECTING VERTICAL FRAMING ERRORS

[76] Inventors: Josef Haas, Siemensstr. 14/6/33, A-1210 Vienna; Ernst Tschida, Bergheidengasse 8/3/8, A-1130 Vienna, both of Austria

[21] Appl. No.: 596,061

[22] Filed: Oct. 11, 1990

[30] Foreign Application Priority Data

Oct. 14, 1989 [DE] Fed. Rep. of Germany ....... 3934420

[51] Int. Cl.$^5$ ............................................. G03B 21/46
[52] U.S. Cl. .................................. 352/160; 352/161; 352/163; 352/164
[58] Field of Search ................. 352/160, 162, 163, 164

[56] References Cited

U.S. PATENT DOCUMENTS

| | | | |
|---|---|---|---|
| 2,192,987 | 3/1940 | Runge | 352/92 |
| 3,565,521 | 2/1971 | Butler et al. | 352/163 |
| 3,622,235 | 11/1971 | Yamada | 352/92 |
| 4,022,525 | 5/1977 | Boudouris | 352/160 |

FOREIGN PATENT DOCUMENTS

| | | |
|---|---|---|
| 2722378 | 5/1978 | Fed. Rep. of Germany . |
| 3217014 | 11/1983 | Fed. Rep. of Germany . |
| 3736790 | 5/1989 | Fed. Rep. of Germany . |

OTHER PUBLICATIONS

Weise, *Kinogeratetechnik*, 1950, pp. 34–39.

Primary Examiner—Monroe H. Hayes
Attorney, Agent, or Firm—Fish & Richardson

[57] ABSTRACT

Method for correcting vertical framing errors during the projection of an intermittently transported perforated motion picture film by means of a film transport sprocket engaging the film perforations, said sprocket being driven by an electric motor whose rotor is connected with an angle indicator device which delivers to a regulating device controlling the electric motor, position signals corresponding to the angular position of the rotor. To correct device-specific vertical framing errors, the frame positions are measured with a geometrically precise measuring film over a plurality of frames, the individual frame positions are stored, and the position of the angle indicator disk is changed by a correction value relative to the film transport sprocket. For correcting operation-dependent vertical framing errors, error tables for framing errors that occur during projection are stored, the frame positions are continuously measured, and the recorded measured values are compared with values stored in the error tables, an error table which optimally represents the measured values is prepared, and a correction table corresponding to this error table is selected whose correction values are delivered to the regulating device.

8 Claims, 4 Drawing Sheets

METHOD AND DEVICE FOR CORRECTING VERTICAL FRAMING ERRORS

The invention relates to methods for correcting vertical framing errors during the projection of intermittently transported perforated motion picture films.

German Patent 27 22 378 teaches a film transport device with a film transport sprocket intermittently driven by an electric motor, the teeth of said sprocket engaging the perforations in the film and transporting the latter stepwise. A control device controls the drive motor of the film transport sprocket in such fashion that the latter advances the film one frame at a time.

The film transport is divided by a current pattern supplied to the drive motor of the film transport sprocket, during each frame, step into an acceleration phase, a deceleration phase, and a position-adjusting or final adjusting phase.

A mark detector is provided for final positioning, said detector scanning marks on the film which have a fixed spatial relationship to the individual frames and generating from them control signals for the drive motor, so that the film, depending on the position of the deviation of the film-integral mark from a predetermined set value position, is advanced or transported backward. Then the deviation from the set value position is detected once again and final positioning of the film is repeated if necessary until the set value position is reached. The perforation holes in the film or marks exposed onto the film serve as film-integral markings.

DE-OS 32 17 014 teaches a film transport device with a claw mechanism driven by a drive motor, the transport and locking claws of said mechanism engaging the perforations in the film with play and advancing the film stepwise by one frame at a time and final-positioning it in the gate. Final positioning of the frames to be projected is accomplished either by using the frame to be projected itself or by using a reference mark associated with the frame.

Since each frame in known film transport devices requires a time interval of only 10 milliseconds, at a rate of 24 frames per second, corresponding to approximately 41 milliseconds, a time of 31 milliseconds remains for the exposure or projection of a frame, thereby ensuring high image brightness and image quality.

In both known devices for correcting vertical framing errors, film-integral marks such as perforations in the film or marks exposed onto the film are required to correct framing deviations and to avoid "frame jumps". This additional positioning aid in the form of film-integral marks is necessary although the electronic positioning of a film transport sprocket as in the subject of DE-PS 27 22 378 is possible with every high precision using an angle indicator disk, a position regulator, and a DC power amplifier.

Despite this electromechanically precise positioning of the film transport sprocket and a required positive coupling between the teeth of the film transport sprocket and the holes constituting the perforations, in practice considerable framing fluctuations do occur. These are due first of all to manufacturing errors in the mechanical positioning elements and operation-dependent factors such as the type of film, the wear on the film transport sprocket, the film channel guiding the film, the motor bearing, and contamination of the angle indicator device.

The single frame correction known from DE-PS 27 22 378 and DE-PS 32 17 014 also has the disadvantage that the film-integral mark must be detected very accurately for single frame correction and must be clearly identifiable even during frequent operation. Various disturbing factors also have a negative effect on the perforations in the film or upon marks that are integral with the film and exposed thereon, since for example the edges of the perforations can become rough, deformed, or contaminated, or a different degree of reflection makes it possible to detect an exposed mark only with difficulty.

The goal of the present invention is to provide a method as well as devices for correcting vertical framing errors during the projection of intermittently transported perforated motion picture films, which minimize vertical framing errors in simple fashion without additional electromechanical final positioning, and during whose use the detection of film-integral marks and their measurement inaccuracies caused by external disturbing factors is not required.

This goal is achieved according to the invention by virtue of the fact that the framing positions are measured with a geometrically precise measuring film over a plurality of frames, the individual framing positions are stored, and the position of the angle indicator device is changed by a correction value with respect to the film transport sprocket.

The solution according to the invention permits highly accurate positioning of the frames with exclusion of machine-specific framing errors, without final positioning devices and film-integral marks with their possible disturbing factors being necessary.

The solution according to the invention is based on the fact that electronic positioning of the film transport sprocket by means of an angle indicator device, a position regulator, a DC power amplifier, and a highly dynamic DC motor is possible with great accuracy, where the exact transmission of the final position of each frame being achieved by a slow, aperiodic pulling of the film against a film friction. The film fits tightly against the flank of the tooth, which is necessary because of the unavoidable play between the tooth and the perforation.

Despite this electromechanically precise positioning of the film transport sprocket and the positive film coupling, in practice considerable framing fluctuations still occur. Because of the very high rotational acceleration of the film transport sprocket it is necessary for physical reasons to use a film transport sprocket with a diameter such that a fraction of one revolution corresponds to a film advance movement of a frame.

As a result of manufacturing errors in the mechanical film positioning elements such as the angle indicator disk, the film transport sprocket, and eccentricities in the common center of rotation, the individual frames show a deviation from the specified position within one revolution. This framing error will be repeated with each revolution.

If we equate one revolution of the film transport sprocket with the projection of n frames, every n-th frame will be at the same position again. This periodic error is a constant, machine-specific value which will be referred to hereinbelow as a machine-specific framing error.

Since we are dealing here with a reproducible value, according to the invention by a single measurement of the frame positions over a large number of frames, for example by simply reading the perforations using a geometrically precise measuring film, it is possible to store permanently for example in an EPROM and correct the deviation of the individual frames from the specified position to eliminate the machine-specific framing error by the correct amount.

Another periodic error which also repeats itself with every n-th frame, where n frames correspond to one revolution of the film transport sprocket, consists in the fact that because of the variation in the film channel between the film transport sprocket and a film pressure pad during one revolution, caused by out-of-roundnesses and eccentricities of the motor shaft and sprocket, the film rests more or less against the film transport sprocket during a revolution and can thus rest at different heights on one tooth flank of the film transport sprocket.

This additional error, referred to hereinbelow as the second periodic error, however, is not a constant machine-specific value but one that depends upon operation.

Factors that influence this second periodic error include the type of film, since for example a thin film has more play in the film channel than a thick film, and a stiff film behaves differently in a variable film channel than a flexible film, wear on the film transport sprocket, on the film channel and motor bearing, contamination of the angle indicator device, etc.

One method for correcting the second possible periodic framing error according to the invention consists in the fact that error tables for framing errors that occur during projection are stored, the framing positions are measured continuously or at freely selectable intervals, and the measured values thus recorded are compared with the values stored in the error tables, and an error table that optimally represents the measured values is found out and a correction table that corresponds to this error table is selected, whose correction values are then output to the regulating device.

An alternative method for reducing the second periodic error consists in the frame positions being measured continuously by reading a film-integral mark, continuously correcting a stored error table with the on-going measured values, and summing the deviations of the actual value positions of the frame from a set value reflecting the correct frame position over a plurality of frames, and by the summed differential values divided by the number of measured values being supplied to the regulating device as an average value for correcting.

Both methods allow sufficient reduction of vertical framing errors in a very simple fashion without requiring additional electromechanical final-positioning devices which are subject to additional sources of error.

Constant measurement of image position correction only after averaging over several frames or by a comparison with a fixed error table has the important advantage over an individual frame correction that the perforation measurements subject to the various disturbing factors or detection of film-integral marks are not used directly for individual frames for final positioning, and hence, for all practical purposes, a more exact frame positioning is possible by averaging the errors.

Finally, the method for reducing the device-specific framing error can be combined with the two methods for reducing the second periodic error, so that both the manufacturing errors in the mechanical film positioning elements and operation-dependent parameters can be taken into account in final positioning of the individual frames, so that the vertical framing errors attributed to these factors can be sufficiently minimized without an additional electromechanical final-positioning device being required whose accuracy depends upon the magnitude of the disturbing factors during perforation measurement or detection of film-integral marks.

The idea which forms the basis of the invention will now be explained in greater detail with reference to one embodiment shown in the drawings.

Figure 1:
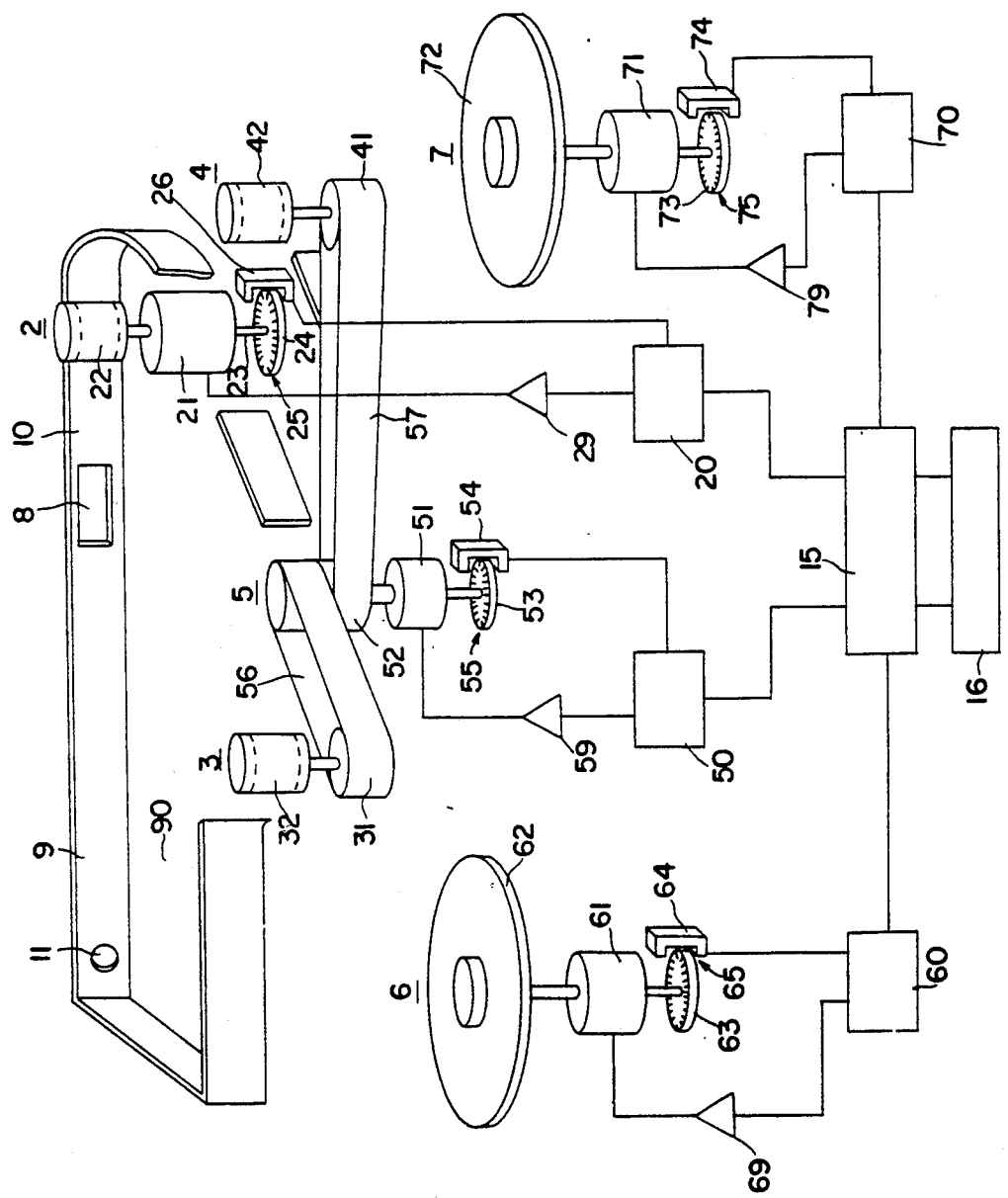
FIG. 1 is a schematic diagram of the individual drive elements of a motion picture projector.

The schematic perspective view shown in FIG. 1 of the important drive components of the film projector according to the invention shows film transport device 2, supply and takeup devices 3 and 4 which are driven by a common drive device 5, winding devices 6, 7, which support the film reels, and, in simplified schematic perspective view, film loop channels 9 and 10 which serve to take up the film loops on both sides of film gate 8.

Film transport device 2 comprises a main motor 21, consisting of a highly dynamic DC servo motor which transmits its rotary motion to film 1 through a directly driven film sprocket 22. Main motor 21 is permanently connected by a shaft 23 with an angle indicator disk 24 of a sensor 25, which determines the exact position of main motor 21 by means of an optoelectronic position sensing device 26, and passes it on.

Supply and takeup devices 3 and 4 comprise a drive shaft 31 and 41, permanently connected each with a sprocket 32 and 42, and transporting the inserted film continuously. Drive shafts 31 and 41 are connected by belts 56 and 57 with drive rollers 52 of drive device 5, which is coupled rigidly by a shaft with a drive motor 51, consisting of a regulated DC motor whose rpm is proportional to the set frame frequency. An angle indicator disk 53 permanently connected with the motor shaft serves to determine the rpm and position of drive motor 51, said disk, together with an optoelectronic scanning device 54, constituting a sensor 55.

Winding devices 6 and 7 for taking up the film reels comprise a winding plate 62 and 72, each connected by a shaft with a winding motor 61 or 71, said motor being designed as a DC motor. An angle indicator disk 63, 73, permanently connected with the shaft of the respective winding motor 61 or 71, serves to measure the rpm and rotational direction of winding motors 61 and 71, said disk, together with an optoelectronic scanning device 64 or 74, forming a sensor device 65, 75. Film loop channels 9 and 10 serve to receive the film loops formed on both sides of film gate 8, whereby in the present case, because of the special design of the control and regulating device, only one loop measuring device 11 is provided in film loop channel 9 which is located to the left of film gate 8. Loop measuring device 11 can consist of a light barrier or a light-emitting diode (LED) in connection with a phototransistor opposite.

Winding plates 62 and 72 serve to receive the film reels with the film optionally being unwound from left-hand winding plate 62 and moved through the film channel described below to right-hand winding plate 72, or vice versa. Depending on the user's choice, film 1 can also be placed in any fashion on winding plates 62 and 72.

Film gate 8 and film transport device 2 with film sprocket 22 are disposed between supply and takeup devices 3 and 4. Film gate 8 is part of a film contact strip which has a bent film guide way in the vicinity of the film sprocket, the curvature of said guide way matching the diameter of film sprocket 22.

A higher-ranking control, regulating, and monitoring system 15 is connected by an input keyboard 16 for input of desired film projector functions such as frame transport forward and backward with variable transport speed, search, fast forward and rewind, or the like. Preferably it has a microprocessor which is connected with a memory for storing desired functions of the film projector.

The higher-order control, regulating, and monitoring system 15 is connected on the output side with the electronic control and regulating elements 20, 50, 60, 70 for the individual drive elements of the film projector. The outputs of electronic control and regulating elements 20, 50, 60, and 70 are connected by downstream DC power amplifiers 29, 59, 69, 79 with main motor 21 of film transport device 2, drive motor 51 of drive device 5, and left-hand winding motor 61 and right-hand winding motor 71 of the two winding devices 6 and 7.

Sensors 25 and 55 of main motor 21 and drive motor 51, coupled to the motor shafts, deliver corresponding position, rpm, and/or rotational direction signals to the inputs of the corresponding control and regulating elements 20 and 50 as well as to the higher-order control, regulating, and monitoring system. Sensors 65 and 75 coupled with the motor shafts of winding motors 61 and 71 deliver output signals exclusively to the inputs of higher-order control, regulating, and monitoring system 15. The signal delivered by the loop measuring device is also fed to one input of control, regulating, and monitoring system 15.

Figure 2:
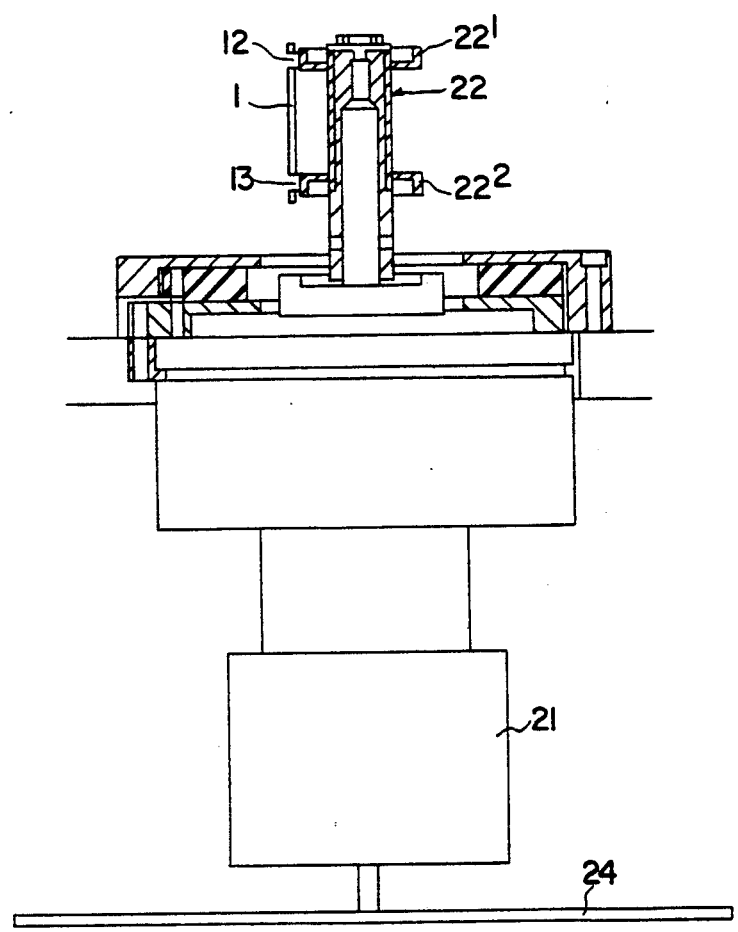
FIG. 2 is a cross section through a film transport device with a film transport sprocket.

The cross section in FIG. 2 through a film transport device shows a film transport sprocket with two tooth circles $22^2$ and $22^2$, said sprocket being permanently connected with the shaft of a drive motor 21, on whose shaft an angle indicator disk 24 for precise positioning of drive motor 21 is also mounted. The upper and lower tooth circles 4 and $22^2$ of film transport sprocket 22 engage corresponding rows of perforations 12 and 13 in a film 1, whereby the engagement is promoted by a guide, not shown in greater detail, in the form of a film guide way or the like.

The engagement of the teeth of the film transport sprocket in the film perforations occurs over a circumferential range of the film transport sprocket which depends on the film path, so that several teeth in each tooth circle $22^1$ and $22^2$ of film transport sprocket 22 simultaneously engage corresponding holes in the film perforations. Usually, four to six teeth of film transport sprocket 22 simultaneously engage the holes that constitute the perforations.

The engagement of the teeth of film transport sprocket 22 in the film perforations takes place with maintenance of a certain amount of play, i.e. the tooth thickness of the teeth of film transport sprocket is less than the width of the holes. In this manner, the teeth of film transport sprocket 22 are prevented from abutting the sides of the perforations on both sides, which, because of the film tension, would lead to damage to the film perforations and to an increased noise level.

This play between the teeth of film transport sprocket 22 and the film perforations, however, even if a predetermined film tension is maintained, results in inaccurate positioning of the individual frames in front of film gate 8, so that the advantage of exact positioning with the aid of an angle indicator system for drive motor 2 is cancelled out by this inaccurate guidance of film 1.

In order to transfer the exact positioning of the film, which is created by using a drive motor for the film transport sprocket with an angle indicator system, to the positioning of the film in front of the film gate, the movement of film 1 prior to projection of a frame is adjusted so that the leading flank of a tooth of film transport sprocket 22 which is forward in the direction of rotation of film transport sprocket 22 abuts the leading edge of at least one hole in the film perforations at the moment a frame is projected.

Figure 3:
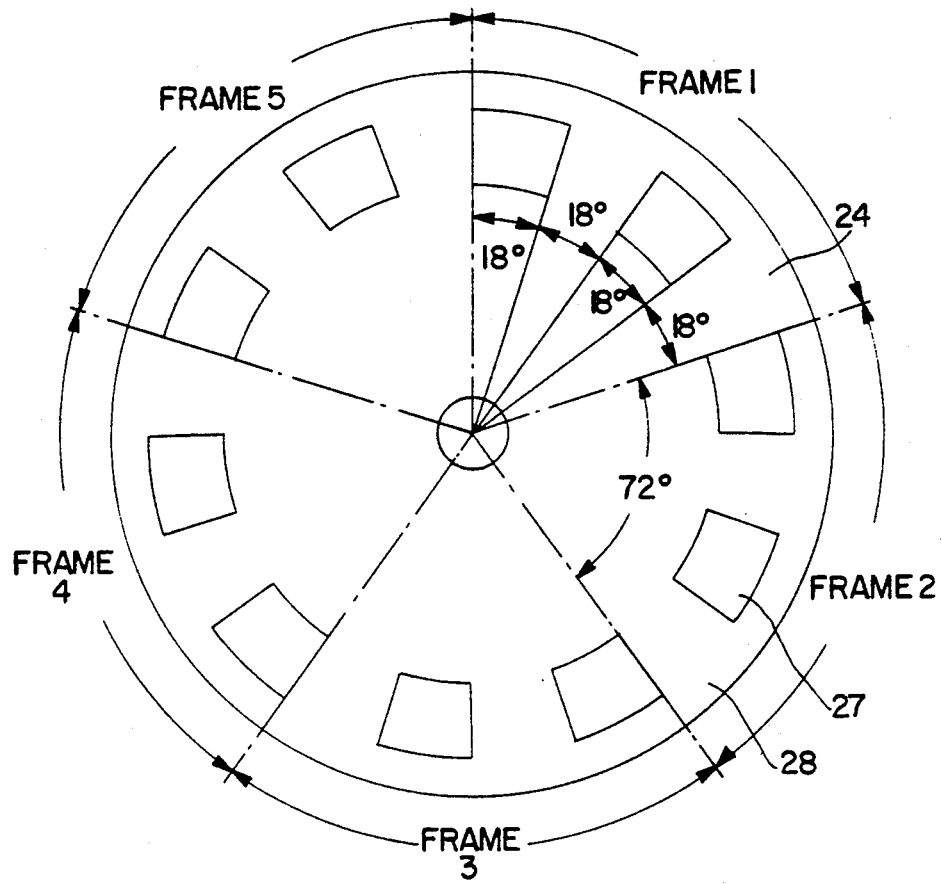
FIG. 3 is a top view of an angle indicator disk of an angle indicator device.

FIG. 3 shows a top view of an angle indicator disk 24 for determinating the shaft rotation angle by means of a photoelectronic scanning device consisting of a light source and a light sensor mounted on both sides of angle indicator disk 24 in the vicinity of the slots or openings 27 and the ribs 28 between them.

Angle indicator disk 24 shown in FIG. 3 has ten openings 25 and ten ribs 28 between them. A rotational angle of 72° corresponding to two openings 27 and two ribs 28 corresponds to the film transport of one frame, so that with one complete revolution of angle indicator disk 24, five frames are positioned.

By suitable positioning of the light source and the light sensor of the angle indicator device for example when the light beam center strikes one edge of an opening 27, a frame on the film is centered opposite film gate 8 as shown in FIG. 1. In this position, half of the light beam falls through opening 27 while the other half is blocked by a rib 28 of angle indicator disk 24. In this position the DC power amplifier 29 connected to the light sensor is adjusted to a zero output signal.

Figure 4:
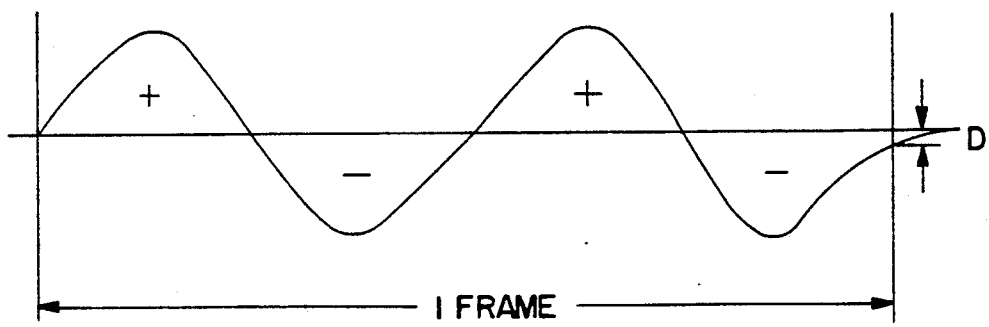
FIG. 4 is a graph showing the measurement signal detected by the angle indicator device as a function of time.

As soon as electric motor 21 as shown in FIG. 1 rotates angle indicator disk 24, DC power amplifier 29 generates an approximately sinusoidal output signal as shown in FIG. 4, which consists of two positive and two negative half waves.

As the graph in FIG. 4 shows, at the end of one frame as a result of manufacturing errors in the angle indicator disk and the film transport sprocket, and because of eccentricities in the motor shaft, deviation of the frame from the set value position occurs. This error is repeated with each revolution of the film transport sprocket.

When an angle indicator disk as shown in FIG. 3 is used, five frames are positioned during one revolution of the angle indicator disk, with every fifth frame recurring at the same position. This deviation of the actual position of each frame from the correct specified position is due to the fact that in the final analysis the positioning device does not correctly position the frame in front of the film gate, but instead positions the angle indicator disk, so that mechanical deviations between the angle indicator disk and the film transport sprocket when the film is in a specific position on the teeth of the film transport sprocket is bound to lead to vertical framing errors.

Figure 5:
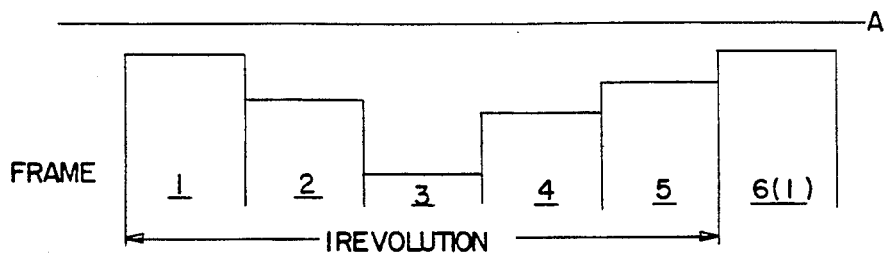
FIG. 5 is a schematic diagram of the deviation of the individual frames from an exact set value position during one revolution of the film transport sprocket.

FIG. 5 is a schematic diagram showing the deviations of the individual frame positions of frames 1 to 5 during one revolution of the film transport sprocket from a set value position A which corresponds to the correct positioning of a frame in front of the film gate.

These completely different deviations in FIG. 5, but which can partly agree with one another as well, are measured once with an extremely precise measuring film which rules out geometric film errors using a plurality of frames for example by reading the perforations once and storing them in a projector-specific memory, for example an EPROM. Measurement takes place in both rotational directions of the film transport device so that, for example in the case of a film transport sprocket with twenty teeth uniformly distributed around the circumference, forty correction values are stored. During the projection of any film, as each frame is projected the corresponding value is called up and given as a set value correction, so that final positioning of the frame in question by this correction value takes place.

Expressed in graphic terms, the angle indicator disk, during each positioning of a frame, is staggered by a predetermined amount so that the sensor device detects an exact positioning and stops the film. In this manner, machine-specific errors and the resultant machine-specific framing errors are eliminated for each frame and exact frame positioning is ensured.

The second periodic operation-dependent error which likewise occurs repetitively in each fifth frame is due to variations in the film channel between the film transport sprocket and the film pressure pd during a revolution, caused by out-of-roundnesses and eccentricities of the motor shaft and film transport sprocket, and is influenced by the type of film (thin or thick film, stiff or flexible film), wear phenomena on the film transport sprocket, film channel, and motor bearings, contamination of the angle indicator disk, etc.

To reduce this vertical framing error, an additional framing correction is performed which can take two forms.

In a first method for minimizing the operation-dependent vertical framing error, for the various cases that occur during operation for example as a function of the different types of film, error tables are stored. By constantly measuring the film stop positions and comparing the resultant deviations from a desired set value position with the stored error tables, an error table is found out which matches the measured values as closely as possible. A correction table associated with this error table is then found out as an optimum correction table and used to correct the frame positioning.

Figure 6:
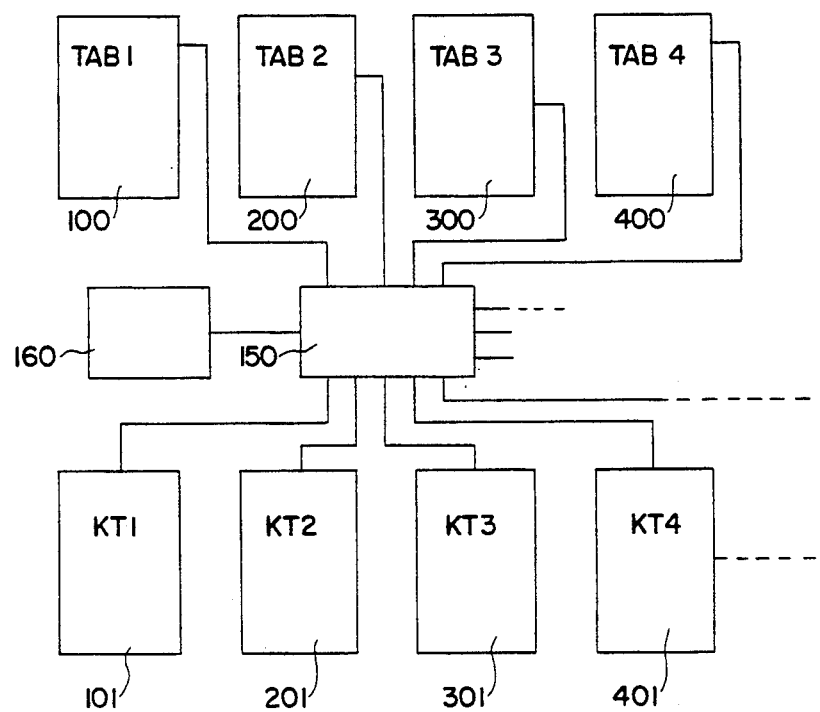
FIG. 6 is a schematic diagram of the memory organization of the regulating device for positioning the film transport sprocket.

FIG. 6 shows schematically the memory organization in conjunction with a higher-order control and regulating device which is preferably in the form of a processor. The memory associated with processor 150 contains a plurality of tables 100 to 400 which contain different errors that occur during operation. These errors can depend on the type of film for example.

A measuring device 160 connected with processor 150 continuously measures the frame stop positions and delivers the detected values to processor 150. The latter compares the recorded measured values with the values stored in the various tables 100 to 400 and in this manner determines that error table which comes closest to the deviations detected by measuring device 160.

A correction table 101 to 401 that is associated with the error table in question is then selected by processor 150 as the optimum correction table and used to correct the frame positioning, in which, figuratively speaking, the angle indicator disk is appropriately displaced during each frame positioning.

In an alternative method for correcting operation-dependent vertical framing errors, the stop positions of the frames are constantly measured by reading the perforations and a stored error table is continuously corrected. The measured errors are summed over a plurality of frames and divided by the number of measured frames so that an average value is fed to the position regulator for correction.

Figure 7:
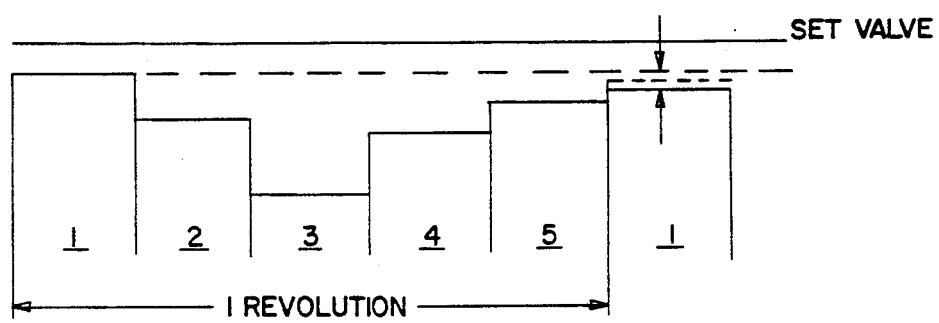
FIG. 7 is a schematic diagram of the method for correcting a second periodic error.

FIG. 7 is a schematic diagram showing averaging of frame positioning over a plurality of measured frames in the way that a position deviation of the frame to be positioned during one complete revolution of film transport sprocket is being averaged in accordance with the dashed curve.

With a combination of the frame correction according to FIG. 5 with the frame correction according to FIGS. 6 or 7, therefore, vertical framing errors can be optimally corrected without additional electromechanical final-positioning devices which are subject to additional errors, being required. In particular, inaccurate perforation reading is avoided, so that during the projection of a film with sharply deviating spaces between the holes, of the perforations additional errors in vertical framing position as a result of an inaccurate measurement of the perforations will not take place.

The invention is not limited in its design to the preferred embodiment described above. Rather, a number of variations are possible which utilize the solution described, even in embodiments that are basically very different. In particular, the embodiment is not limited to the version with discrete logic modules, but advantageously can be produced with programmed logic, preferably using a microprocessor.

What is claimed:

1. A method of correcting vertical framing errors in the projection of an intermittently transported perforated motion picture film in projection apparatus that includes a film transport sprocket engaging film perforations, said sprocket being driven by an electric motor whose rotor is connected with an angle indicator device which delivers position signals corresponding to the angular position of said rotor to a regulating device for controlling said electric motor, comprising the steps of
measuring a series of frame positions over a plurality of frames with a geometrically accurate measuring film,
storing data on said series of measured frame positions and
periodically changing the position of said angle indicator disk relative to said film transport sprocket by a correction value as a function of said stored series of measured frame positions data.

2. The method of claim 1 wherein said correction value corresponds to the residual distance of a vertical frame interval from a correct set value position.

3. The method of claim 1 and further including the steps of storing vertical frame position deviations in a fixed value memory of said regulating device and correcting the set value position of each individual frame in accordance with the stored vertical frame position deviation value.

4. A method of correcting vertical framing errors in the projection of an intermittently transported perforated motion picture film in projection apparatus that includes a film transport sprocket engaging film perforations, said sprocket being driven by an electric motor whose rotor is connected with an angle indicator deice which delivers position signals corresponding the angular position of the rotor to a regulating device controlling said electric motor, comprising the steps of
 storing framing errors that occur during projection in error tables,
 measuring frame positions,
 comparing recorded measured values with the values stored in said error tables,
 preparing an error table optimally representing said measured values,
 and selecting a correction table corresponding to this error table whose correction values are delivered to regulating device.

5. A film transport device for working the method according to claim 4 comprising a reading memory for storing said error tables, a frame of said film measuring device for determining the position of a frame during its projection, a set value indicator for specifying a set value for an exact frame position, a difference former to indicate the deviation of said actual value position of the frame from said specified set value delivered by said set value indicator, a comparison device for comparing values delivered by said difference former with values in said error tables stored in said memory, and a selecting device responsive to a maximum correspondence of values of successive comparisons by said comparison device for selecting a correction table for frame stop positioning.

6. A method for correcting vertical framing errors in the projection of an intermittently transported perforated motion picture film in projection apparatus that includes a film transport sprocket engaging film perforations, said sprocket being driven by an electric motor whose rotor is connected with an angle indicator device which delivers position signals that correspond to the angular position of said rotor to a regulating device for controlling said electric motor,
 comprising the steps of
 continuously measuring frame positions by detecting a film-integral mark,
 continuously correcting a stored error table with said on-going measured values,
 summing deviations of actual value positions of the frames from a set value indication that shows the correct frame positions over a plurality of frames,
 dividing said summed differential values by the number of measured values, and
 supplying to said regulating device the resulting quotient value as an average for correcting said regulating device.

7. A method of correcting vertical framing errors in the projection of an intermittently transported perforated motion picture film in projection apparatus that includes a film transport sprocket engaging film perforations, said sprocket being driven by an electric motor whose rotor is connected with an angle indicator device which delivers position signals corresponding to the angular position of the rotor to a regulating device controlling the electric motor, comprising the steps of
 measuring the frame positions with a measuring film over a plurality of frames,
 storing corresponding frame position indications,
 storing framing errors that occur during projection in error tables, measuring frame positions continuously,
 comparing recorded measured values with values stored in said error tables,
 preparing an error table which optimally represents the measured values,
 selecting a correction table corresponding to said error table whose correction values are delivered to said regulating device, and changing the position of said angle indicator device relative to said film transport sprocket by said correction value.

8. A method of correcting vertical framing errors in the projection of an intermittently transported perforated motion picture film in projection apparatus that includes a film transport sprocket engaging film perforations, said sprocket being driven by an electric motor whose rotor is connected with an angle indicator device which delivers position signals corresponding to the angular positions of said rotor to a regulating device controlling said electric motor,
 comprising the steps of
 measuring frame positions with a measuring film over a plurality of frames,
 storing the corresponding frame positions,
 continuously measuring said frame positions by detecting a film-integral mark,
 continuously correcting a stored error table using said on-going measured values,
 summing the deviations of actual value positions of the frame from a set value corresponding to the correct frame stop position over a plurality of frames, dividing the summed differential values by the number of measured values for use as an average for correcting, supplying said average value to said regulating device, and changing the position of the angle indicator device relative to the film transport sprocket by a correction value.

* * * * *